United States Patent
Kumar

(10) Patent No.: US 8,291,037 B2
(45) Date of Patent: *Oct. 16, 2012

(54) NETWORKED LOCAL MEDIA CACHE ENGINE

(75) Inventor: Saket Kumar, Cupertino, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 315 days.

This patent is subject to a terminal disclaimer.

(21) Appl. No.: 12/489,942

(22) Filed: Jun. 23, 2009

(65) Prior Publication Data
US 2010/0049758 A1  Feb. 25, 2010

Related U.S. Application Data

(63) Continuation of application No. 10/805,042, filed on Mar. 18, 2004, now Pat. No. 7,568,042.

(51) Int. Cl.
*G06F 15/16* (2006.01)

(52) U.S. Cl. ........ 709/217; 709/203; 709/219; 709/231; 711/113

(58) Field of Classification Search .......... 709/217, 709/231, 203, 219; 711/113
See application file for complete search history.

(56) References Cited

U.S. PATENT DOCUMENTS

| | | | |
|---|---|---|---|
| 7,209,874 B2 | 4/2007 | Salmonsen | |
| 2004/0117858 A1 | 6/2004 | Boudreau et al. | |
| 2006/0159109 A1 | 7/2006 | Lamkin et al. | |
| 2006/0161635 A1* | 7/2006 | Lamkin et al. | 709/217 |

* cited by examiner

*Primary Examiner* — Frantz Jean
(74) *Attorney, Agent, or Firm* — Haverstock & Owens LLP

(57) ABSTRACT

A local media cache engine stores content locally for a particular local device. The content is downloaded or copied from other source devices within a network of devices, when the particular local device is coupled to the network. The content is then available to the local device even when that device is not coupled to the network or when the source device is not coupled to the network. Further, even when the source device of the content is coupled to the network, the local cache provides an easier and faster source of desired content for the local device. The content from the local cache is available to be loaded on a portable device through a synchronization operation. The local media cache engine also has the capability to automatically search for content from the source devices within the network and download the content to the local cache, based on user defined preferences and criteria.

26 Claims, 8 Drawing Sheets

NETWORKED LOCAL MEDIA CACHE ENGINE

RELATED APPLICATIONS

This application is a continuation of U.S. patent application Ser. No. 10/805,042, filed on Mar. 18, 2004 now U.S. Pat. No. 7,568,042, entitled NETWORKED LOCAL MEDIA CACHE ENGINE. The U.S. patent application Ser. No. 10/805,042, filed on Mar. 18, 2004, entitled NETWORKED LOCAL MEDIA CACHE ENGINE is also hereby incorporated by reference.

FIELD OF INVENTION

The present invention relates to the field of transmitting information between devices within a network structure. More particularly, the present invention relates to the field of providing a local storage cache of information or media available from a network of devices.

BACKGROUND

The Universal Plug and Play, e.g. UPnP, standard is designed to enable simple and robust connectivity among stand-alone devices and personal computers (PCs) from many different vendors. With UPnP, a device can dynamically join a network, obtain an Internet Protocol (IP) address, convey its capabilities, and learn about the presence and capabilities of other devices. Devices can subsequently communicate with each other directly, thereby enabling discovery and control of devices. UPnP uses standard Transmission Control Protocol/Internet Protocol (TCP/IP) and Internet protocols which facilitates interoperability with existing networks.

The basic building blocks of a UPnP network are devices, services and control points. A UPnP device is a container of services and nested devices. A UPnP device can be, but does not have to be, a physical device. Different categories of UPnP devices are associated with different sets of services and embedded devices. For instance, services within a video cassette recorder (VCR) are different than those within a printer. The set of services provided by a particular device, as well as a list of properties associated with the particular device, are captured in a device description document that the device must host. Preferably, this device description document is written in Extensible Markup Language (XML).

A service exposes actions and models its state with state variables. For instance, as an example, a clock service can be modeled as having a state variable, current_time, which defines the state of the clock, and two actions, set_time and get_time, which enables control of the service. Similar to the device description, this information is part of a service description document preferably written in XML. The UPnP Forum defines UPnP Device and Service Descriptions according to a common architecture. A pointer, such as a Uniform Resource Locator (URL), to each appropriate service description document is included within a device description document. Devices may include multiple services.

A service in a UPnP device includes a state table, a control server and an event server. The state table models the state of the service through state variables and updates them when the state changes. The control server receives action requests, such as set_time, executes the action requests, updates the state table and returns responses. The event server publishes events to interested subscribers anytime the state of the service changes. For instance, a fire alarm service sends an event to interested subscribers when its state changes to "ringing."

A control point in a UPnP network is a controller capable of discovering and controlling other devices. After discovery of a network device, a control point can retrieve the device description and get a list of associated services, retrieve service descriptions for available services and invoke actions to control the service. The control point can also subscribe to the service's event source such that anytime the state of the service changes, the event server sends an event to the control point.

UPnP uses open, standard protocols such as TCP/IP, HyperText Transport Protocol (HTTP) and XML. Using these standardized protocols aids in ensuring interoperability between vendor implementations. Other technologies can also be used to network devices together. Such technologies include networking technologies such as Home Audio Video Interoperability (HAVi), Consumer Electronic Bus (CEBus), LonWorks, European Installation Bus (EIB), or X10. These too can participate in the UPnP network through a UPnP bridge or proxy.

A conventional protocol stack used to implement UPnP is illustrated in FIG. 1. The protocol stack includes a TCP/IP networking protocol stack 10, an HTTP layer 18, an HTTPU (HTTP unicast over User Datagram Protocol (UDP)) layer 20, an HTTPMU (HTTP multicast over UDP) layer 22, an SSDP (Simple Service Discovery Protocol) layer 24, a GENA (General Event Notification Architecture) layer 26, a SOAP (Simple Object Access Protocol) layer 28, a UPnP Device Architecture Defined layer 30, a UPnP Forum Working Committee Defined layer 32 and a UPnP Vendor Defined layer 34. The TCP/IP protocol stack 10 includes an IP layer 16, a TCP layer 14 and a UDP layer 12. The TCP/IP networking protocol stack 10 serves as the base on which the rest of the UPnP protocols are built. By using the standard, prevalent TCP/IP protocol suite, UPnP leverages the protocol's ability to span different physical media and ensures multiple vendor interoperability. UPnP devices can use many of the protocols in the TCP/IP protocol suite including TCP, UDP, IGMP (Internet Group Multicast Protocol), ARP (Address Resolution Protocol) and IP, as well as TCP/IP services such as DHCP (Dynamic Host Configuration Protocol) and DNS (Domain Name System). TCP/IP provides the base protocol stack for network connectivity between UPnP devices.

All aspects of UPnP build on top of HTTP or its variants. HTTPU and HTTPMU are variants of HTTP defined to deliver messages on top of UDP/IP instead of TCP/IP. HTTPU and HTTPMU are protocols used by SSDP, which is described below. The basic message format used by HTTPU and HTTPMU adheres with that of HTTP and is required both for multicast communication and when message delivery does not require the overhead associated with reliability.

SSDP provides a mechanism for discovering network devices on the network. SSDP is built on HTTPU and HTTPMU and defines methods both for a control point to locate resources on the network, and for devices to announce their availability on the network. By defining the use of both search requests and presence announcements, SSDP eliminates the overhead that would be necessary if only one of these mechanisms is used. As a result, every control point on the network has complete information on network state while keeping network traffic low.

Both control points and devices use SSDP. A UPnP control point, upon booting up, can send a multicast SSDP search request over HTTPMU to discover devices that are available on the network. The control point can refine the search to find only devices of a particular type, such as a VCR, particular services, such as devices with clock services, or even a particular device. UPnP devices listen to the multicast port. Upon receiving a search request, the device examines the search criteria to determine if they match. If a match is found, a unicast SSDP over HTTPU response is sent to the control point. Similarly, a device, upon being connected to the network, sends out multiple SSDP presence announcements advertising itself.

Both presence announcements and unicast device response messages include a pointer, such as a URL, to the location of the device description document, which has information on the set of properties and services supported by the device.

The process involved in UPnP networking includes addressing, discovery, description, control, eventing and presentation. UPnP provides support for communication between control points and devices. The network media, the TCP/IP protocol suite and HTTP provide basic network connectivity and addressing. On top of these open, standard, Internet based protocols, UPnP defines a set of HTTP servers to handle discovery, description, control, events and presentation.

Each device includes a DHCP client that searches for a DHCP server when the device is first connected to the network. If a DHCP server is available, the device uses the IP address assigned to it. If no DHCP server is available, the device uses Auto IP to get an address.

Once devices are attached to the network and addressed appropriately, discovery can take place. Discovery is handled by the SSDP, as discussed above. When a UPnP device is added to the network, SSDP enables the device to advertise its services to control points on the network. When a control point is added to the network, SSDP enables the control point to search for UPnP devices on the network. The fundamental exchange in both cases is a discovery message containing a few, essential specifics about the device or one of its services, for example its type, identifier, and a pointer to its XML device description document.

The next step in UPnP networking is description. After a control point discovers a device, the control point still knows very little about the device. For the control point to learn more about the device and its capabilities, or to interact with the device, the control point must retrieve the device's description from the URL provided by the device in the discovery message.

Devices can include other logical devices and services. The UPnP description for a device is preferably expressed in XML and includes vendor-specific, manufacturer information including the model name and number, serial number, manufacturer name, URLs to vendor-specific Web sites, and so forth. The description also includes a list of any embedded devices or services, as well as URLs for control, eventing and presentation.

After the control point has retrieved a description of the device, the control point has the essentials for device control. To learn more about the service and device, the control point must retrieve a detailed UPnP description for each service. The description for a service is also preferably expressed in XML and includes a list of the commands, or actions, the service responds to, and parameters or arguments, for each action. The description for a service also includes a list of variables. These variables model the state of the service at run time, and are described in terms of their data type, range, and event characteristics.

To control a device, the control point sends an action request to a device's service. To do this, the control point sends a suitable control message to the control URL for the service that is provided in the device description. Control messages are expressed in XML using simple object access protocol (SOAP). In response to the control message, the service returns action specific values or fault codes.

UPnP architecture defines the general interaction between UPnP control points and UPnP network devices containing audio/video (AV) media. The UPnP architecture is independent of any particular device type, content format, and transfer protocol. The UPnP architecture enables a UPnP control point to discover UPnP network devices within a network, and to enumerate the content available on each discovered UPnP network device. Each UPnP network device uses a UPnP Content Directory Service to compile detailed information about each content item on the UPnP network device. Each content item that is referenced by the Content Directory Service includes various information about the content item including the transfer protocol(s) and file format(s) that the UPnP network device storing the content item can use to transfer the content item to another UPnP network device.

The Content Directory Service provides a lookup and storage service that allows control points to locate individual objects that the device is capable of providing. For example, the Content Directory Service is used to enumerate a list of songs stored on an MP3 player, a list of still-images comprising various slide-shows, a list of movies stored in a DVD-Jukebox, a list of television shows currently being broadcast and the like. Nearly any type of content can be enumerated using the Content Directory Service.

The Content Directory Service defines a class system to represent the different types of objects that are managed by the Content Directory Service. The class hierarchy of the Content Directory Service is used to type all objects that can be retrieved from the Content Directory Service. The base class, from which all other classes are derived, is referred to as an object. A class is used to assign a type to an object, and identifies the minimum required and optional set of properties that must be present on that object. Classes are organized in a hierarchy with certain classes being derived from others as in a typical object oriented system. The object base class is at the root of the class hierarchy. An item is a first-level class if derived directly from an object. An item most often represents a single piece of AV data, such as a CD track, a movie or an audio file. Items may be playable, meaning they have information that can be played on a rendering device. A container is a first-level class derived directly from an object. A container represents a collection of objects. Containers can represent the physical organization of objects or logical collections. Logical collections can have formal definitions of their contents or they can be arbitrary collections. Containers can be either homogeneous, containing objects that are all of the same class, or heterogeneous, containing objects of mixed class. Containers can also contain other containers.

In general, a UPnP control point discovers UPnP network devices within a network. This discovery can take place over both wired and wireless networks. The control point interacts with the discovered devices to locate desired content. Once the content is identified, the control point identifies a common transfer protocol and data format that can be used to transfer the content from the UPnP network device on which the content is located and a UPnP network device to which the content is to be rendered. After these transfer parameters are established, the control point controls the flow of content. The actual transfer of the content is performed directly by the two UPnP network devices, the media server and the renderer. The content transfer happens independently from the control point and does not involve the UPnP protocol. The control point uses UPnP to initialize the transfer of the content, but the transfer is performed using an appropriate transfer protocol other than UPnP, including but not limited to HTTP, RTP/RTSP and IEEE 1394.

The Content Directory Service is resident on each respective device having content and represents the content stored on the device. When searching for content within a UPnP network, an application must search each device's Content Directory Service until the desired content is located. Once the desired content is located, that content can then be sent from the appropriate source device to the appropriate receiving device. The content available to any particular device from the network, is content that is available from the other devices currently coupled within the network. If a particular device is not coupled to the network, then the content from the source devices in the network is not currently available to the particular device. Likewise, if one of the source devices with content is not currently coupled to the network, then the content stored on that device is not available to the other devices within the network.

SUMMARY

A local media cache engine stores content locally for a particular local device. The content is downloaded or copied from other source devices within a network of devices, when the particular local device is coupled to the network. The content is then available to the local device even when that device is not coupled to the network or when the source device is not coupled to the network. Further, even when the source device of the content is coupled to the network, the local cache provides an easier and faster source of desired content for the local device. The content from the local cache is available to be loaded on a portable device through a synchronization operation. The local media cache engine also has the capability to automatically search for content from the source devices within the network and download the content to the local cache, based on user defined preferences and criteria.

In a first aspect, a method of locally storing content available from one or more remote source devices within a network of devices comprises identifying and selecting content from a remote source device, requesting a transfer of the content from the remote source device, storing the content received from the remote source device within a local media cache thereby forming a local content copy, providing the local content copy for playback and transfer to a portable device, and receiving user defined preferences and criteria of content to be selected, wherein identifying and selecting content is performed automatically based on the user defined preferences and criteria. A user is involved in identifying and selecting content from a remote source device. Identifying and selecting content is performed periodically based on the user defined preferences and criteria. The method further comprises storing metadata information regarding the content received from the remote source device in a database corresponding to the content. The metadata information is obtained from the source device of the content. The network of devices includes devices that are UPnP enabled.

In another aspect, an apparatus to store content available from one or more remote source devices within a network of devices comprises an interface to the network of devices, a local media cache engine coupled to the interface to request a transfer of identified and selected content from a remote source device and a local media cache coupled to the local media cache engine to store the identified and selected content received from the remote source device thereby forming a local content copy, wherein the local media cache engine receives user defined preferences and criteria of content to be selected and automatically identifies and selects content based on the user defined preferences and criteria. A user identifies and selects the content from the remote source device. The local media cache engine periodically identifies and selects content based on the user defined preferences and criteria. The apparatus further comprises a database for storing metadata information regarding the content received from the remote source device corresponding to the local content copy. The metadata information is obtained from the source device of the content. The network of devices includes devices that are UPnP enabled.

In still another aspect, a local device for storing content available from one or more remote source devices within a network of devices comprises an interface to the network of devices, a local media cache engine coupled to the interface to request a transfer of identified and selected content from a remote source device, a local media cache coupled to the local media cache engine to store the identified and selected content received from the remote source device thereby forming a local content copy, wherein the local media cache engine receives user defined preferences and criteria of content to be selected and automatically identifies and selects content based on the user defined preferences and criteria and a database coupled to the local media cache engine and the local media cache to store information about the local content copy. A user identifies and selects the content from the remote source device. The local media cache engine periodically identifies and selects content based on the user defined preferences and criteria. The metadata information is obtained from the source device of the content. The network of devices includes devices that are UPnP enabled.

In a further aspect, a local media cache engine to store content available from one or more remote source devices within a network of devices comprises a local media cache to identified and selected content received from a remote source device thereby forming a local content copy, wherein the local media cache engine receives user defined preferences and criteria of content to be selected and automatically identifies and selects content based on the user defined preferences and criteria and a database coupled to the local media cache to store metadata information about the local content copy. A user identifies and selects the content from the remote source device. The local media cache engine periodically identifies and selects content based on the user defined preferences and criteria. The metadata information is obtained from the source device of the content. The network of devices includes devices that are UPnP enabled.

In still a further aspect, a network of devices comprises one or more remote source devices each having available content and a local device coupled to the one or more remote source devices to store content available from the one or more remote source devices, the local device including an interface coupled to the one or more remote source devices, a local media cache engine coupled to the interface to request a transfer of identified and selected content from a remote source device, wherein the local media cache engine receives user defined preferences and criteria of content to be selected and automatically identifies and selects content based on the user defined preferences and criteria and a local media cache coupled to the local media cache engine to store the identified and selected content received from the remote source device thereby forming a local content copy. A user identifies and selects the content from the remote source device. The local media cache engine periodically identifies and selects content based on the user defined preferences and criteria. The local device further comprises a database for storing metadata information regarding the content received from the remote source device corresponding to the local copy. The metadata information is obtained from the source device of the content. The network of devices includes devices that are UPnP enabled.

DETAILED DESCRIPTION OF THE PREFERRED EMBODIMENT

A local media cache engine stores content locally for a particular local device. When the local device is coupled to a network of devices, the content is downloaded or copied from other source devices within the network of devices to the local media cache engine. The content is then available to the local device even when that device is not coupled to the network or when source devices for the content are not coupled to the network. Further, even when the source device of the content is coupled to the network, the local cache provides an easier and faster source of desired content for the local device. The content from the local cache is then available to be loaded on a portable device through a synchronization operation.

To obtain the content to be loaded in the local media cache, the local media cache engine identifies content to be downloaded. This identified content is either content a user selects when searching or browsing the directories of the source devices within the network, or content that matches certain user-defined preferences that is identified automatically by the local media cache engine. The local media cache engine also has the capability to automatically search for content from the devices within the network and download the content to the local media cache, based on the user-defined preferences and criteria. Once content is identified, the local media cache engine sends a request to the source device to have the content sent to the local device. The content is then received at the local device and stored within the local media cache for use at the local device. Once the content is stored in the local media cache, the user then has the ability to play, view and/or listen to the content within the local media cache or load the content on a portable device through a synchronization operation or any other appropriate data transfer operation.

Figure 1:
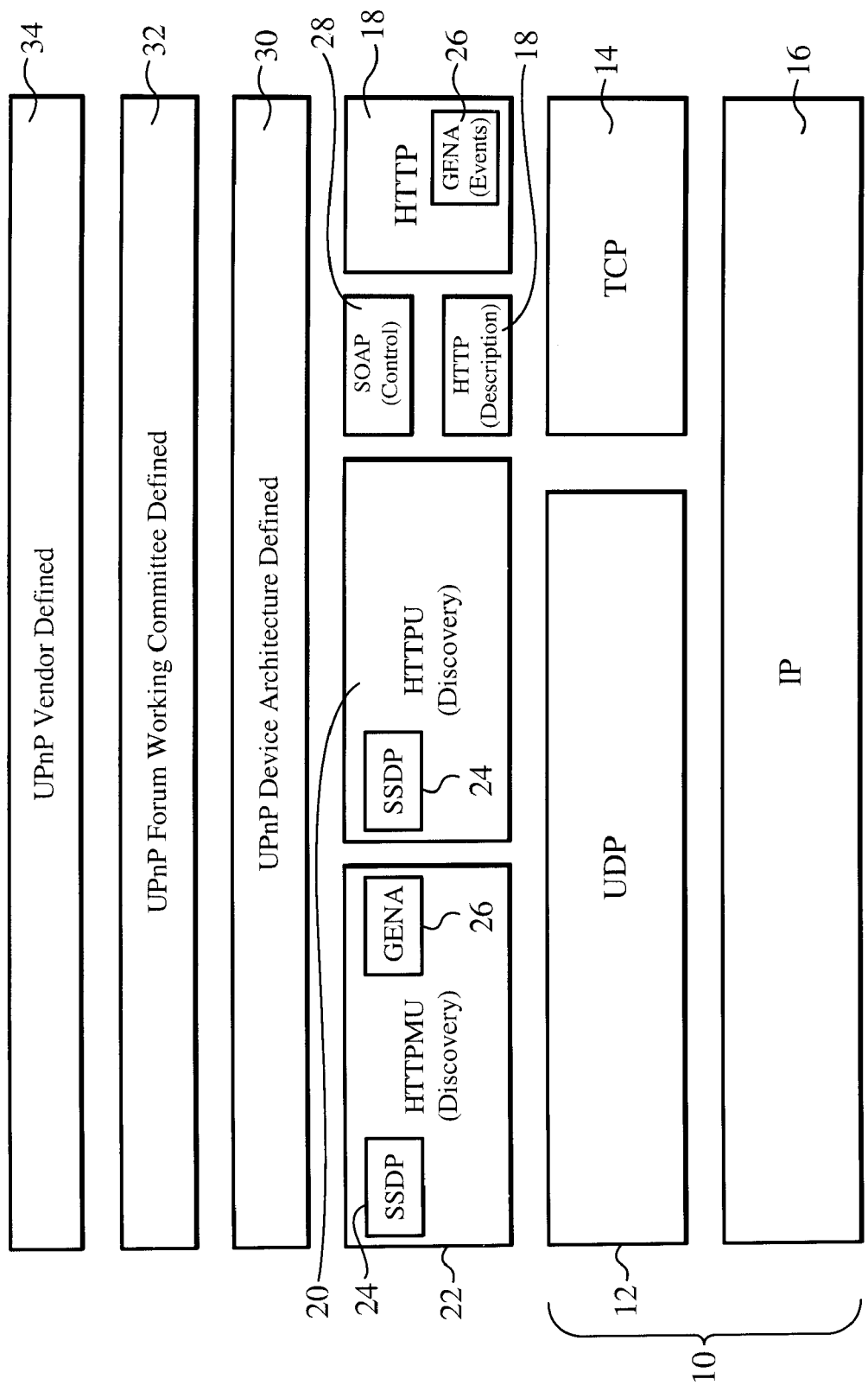
FIG. 1 illustrates a conventional protocol stack used to implement UPnP.
Figure 2:
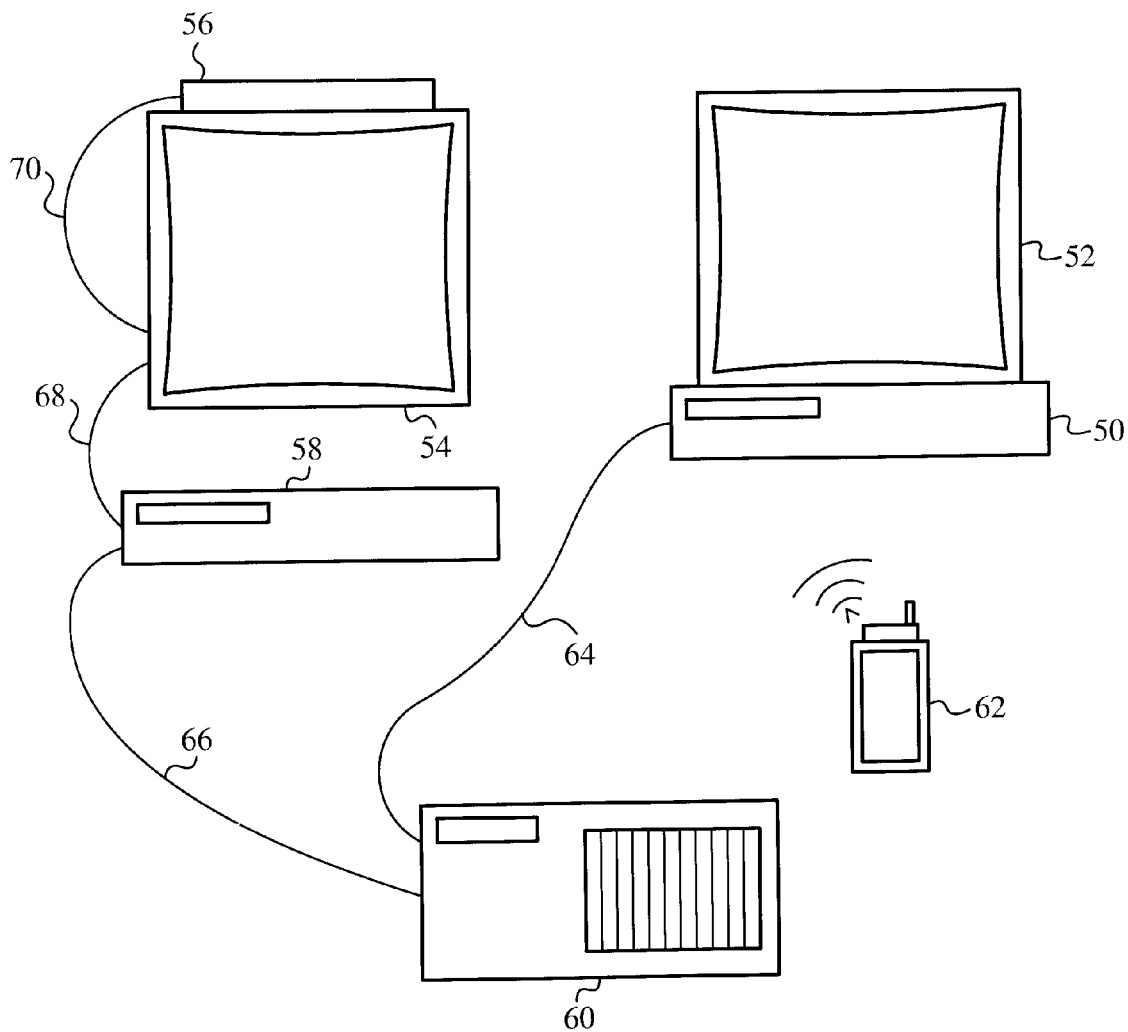
FIG. 2 illustrates an exemplary network of devices including a computer system 50 with display 52, a CD jukebox 60, a DVD player 58, a television 54 and a settop box 56, coupled together by input/output (I/O) busses 64, 66, 68 and 70.

FIG. 2 illustrates an exemplary network of devices including a computer system 50 with an associated display 52, a CD jukebox 60, a DVD player 58, a television 54 and a settop box 56, coupled together by input/output (I/O) busses 64, 66, 68 and 70. The exemplary network of FIG. 2 also includes a personal digital assistant (PDA) device 62 wirelessly coupled to the network. The I/O bus 64 couples the computer system 50 to the CD jukebox 60. The I/O bus 66 couples the CD jukebox 60 to the DVD player 58. The I/O bus 68 couples the DVD player 58 to the television 54. The I/O bus 70 couples the television 54 to the settop box 56.

Each of the subsystems within the exemplary network of FIG. 2, including the computer system 50, the CD jukebox 60, the DVD player 58, the television 54, the settop box 56 and the PDA device 62 are Universal Plug and Play (UpnP) enabled. Within the exemplary network of FIG. 2, the computer system 50 includes the local media cache engine. Alternatively, the local media cache engine is included within any appropriate device or subsystem within the network.

Figure 3:
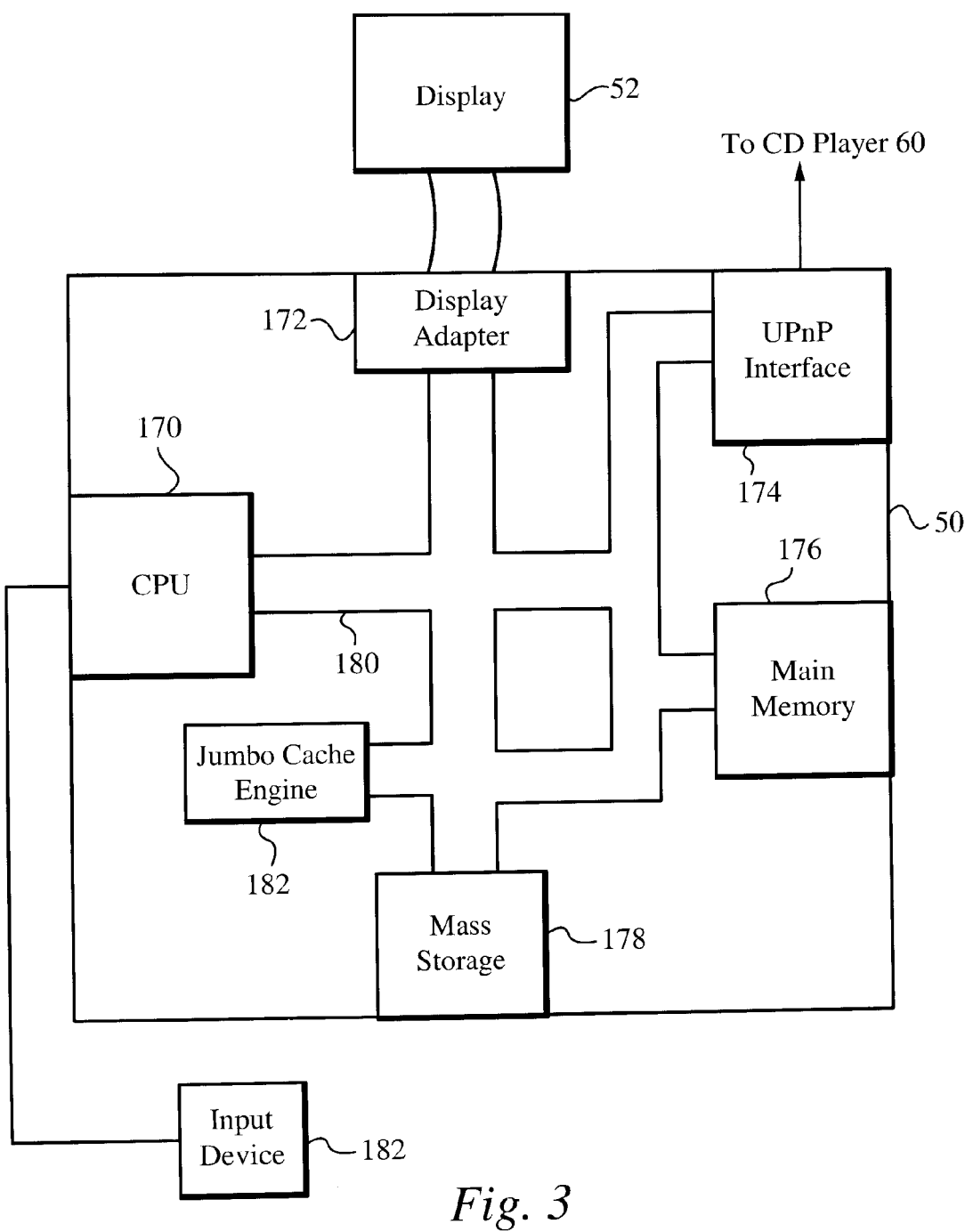
FIG. 3 illustrates a block diagram of the internal components of an exemplary computer system.

An exemplary block diagram of the internal components of the computer system 50 is illustrated in FIG. 3. While the jumbo local media cache engine can be provided and maintained on any appropriately configured device, an exemplary computer system 50 for providing and maintaining the jumbo local media cache engine, is illustrated in FIG. 3. The exemplary computer system 50 includes a CPU 170, a display adapter 172, a UPnP interface circuit 174, a main memory 176, a mass storage device 178 and a jumbo local media cache engine 182, all coupled together by a conventional bidirectional system bus 180. The UPnP interface 174 preferably operates according to the UPnP protocol and couples the computer system 50 to the network of devices through an included network adapter. The mass storage device 178 may include both fixed and removable media using any one or more of magnetic, optical or magneto-optical storage technology or any other available mass storage technology. Content within the computer system 50 is stored within the mass storage device 178. The system bus 180 contains an address bus for addressing any portion of the memory 176 and 178. The system bus 180 also includes a data bus for transferring data between and among the CPU 170, the main memory 176, the display adapter 172, the mass storage device 178, the UPnP interface 174 and the jumbo cache engine 182.

The computer system 50 is also coupled to a number of peripheral input and output devices including the input device 182 and the associated display 52. The input device 182 may be any appropriate input device including keyboard, mouse, touch screen or stylus.

The display adapter 172 interfaces between the components within the computer system 50 and the display 52. The display adapter 172 converts data received from the components within the computer system 50 into signals which are used by the display 52 to generate images for display.

As will be apparent to those skilled in the art, the local media cache engine 182 is capable of being implemented as a separate component within the computer system 50. Alternatively, the jumbo cache engine 182 will utilize other components within the computer system 50, such as the main memory 176 and/or the mass storage device 178.

Figure 4:
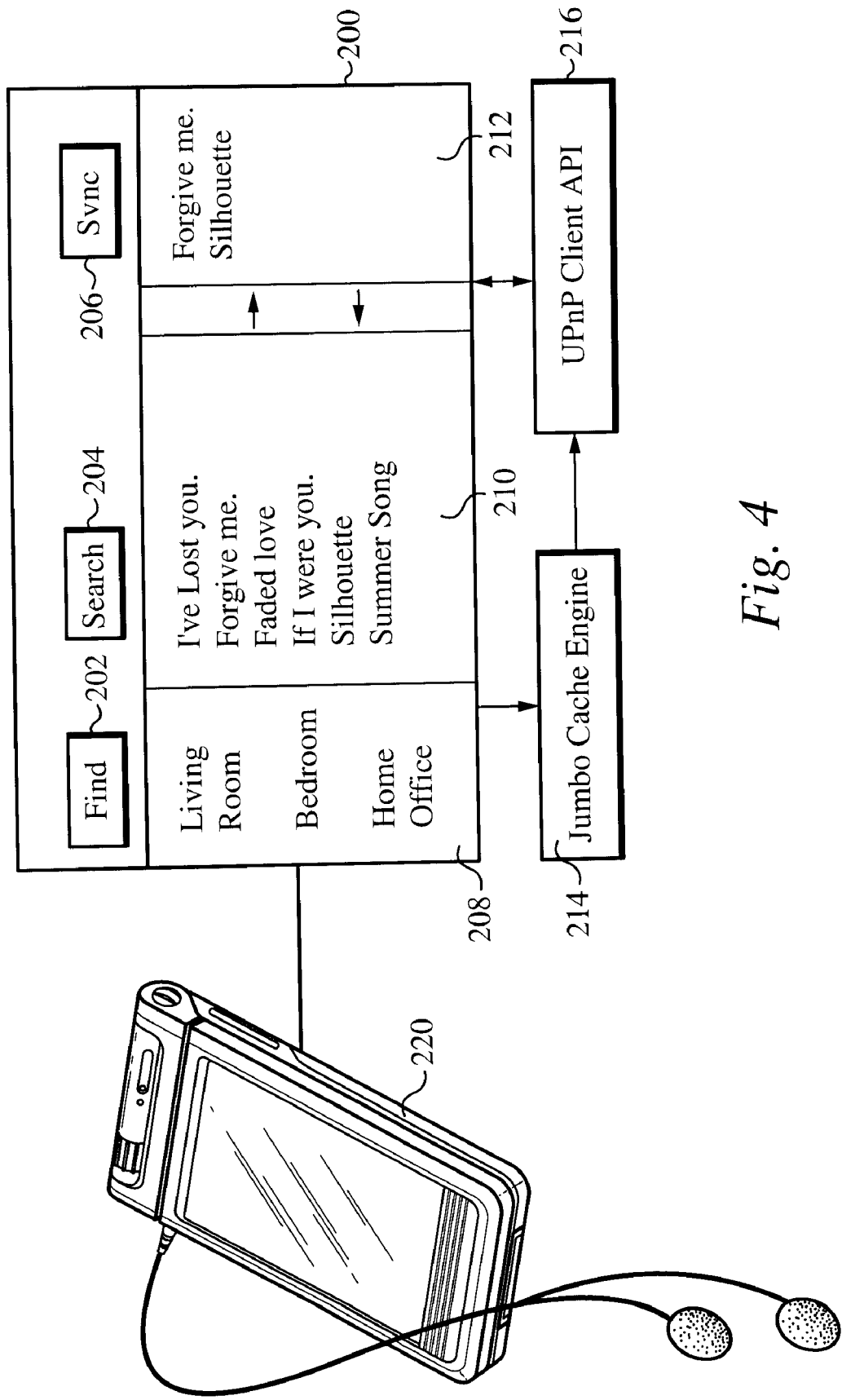
FIG. 4 illustrates an integration of the jumbo cache engine with a graphical user interface to manage a collection of music to loaded on a portable device through a synchronization operation.

An integration of the local media cache engine with a graphical user interface to manage a collection of music to be transferred to a portable device is illustrated in FIG. 4. The graphical user interface 200 includes a server window 208, an available song list window 210 and a selected song window 212. The server window 208 includes a list of all of the servers from which songs were copied. The available song list window 210 includes a list of all songs copied from a selected server. From the available song list window 210, a user is able to select songs that are then listed in the selected song window 212. Using the sync command button 206, a user is able to cause the songs listed within the selected song window 212 to be copied to the portable device 220. The find command button 202 is used to find available songs or media from the jumbo media cache engine. The search command button 204 is used to search the available songs or media for a particular song or media item. The jumbo media cache engine 214 and the UPnP client API 216 are used to provide the songs or media listed within the graphical user interface 200 for transferring to the portable device 220. It should be apparent to those skilled in the art that while songs are illustrated and described in the exemplary graphical user interface 200 of FIG. 4, the graphical user interface 200 and jumbo media cache engine 214 are utilized to obtain, copy and provide any other appropriate types of media, including music, pictures, videos and other data collections.

Figure 5:
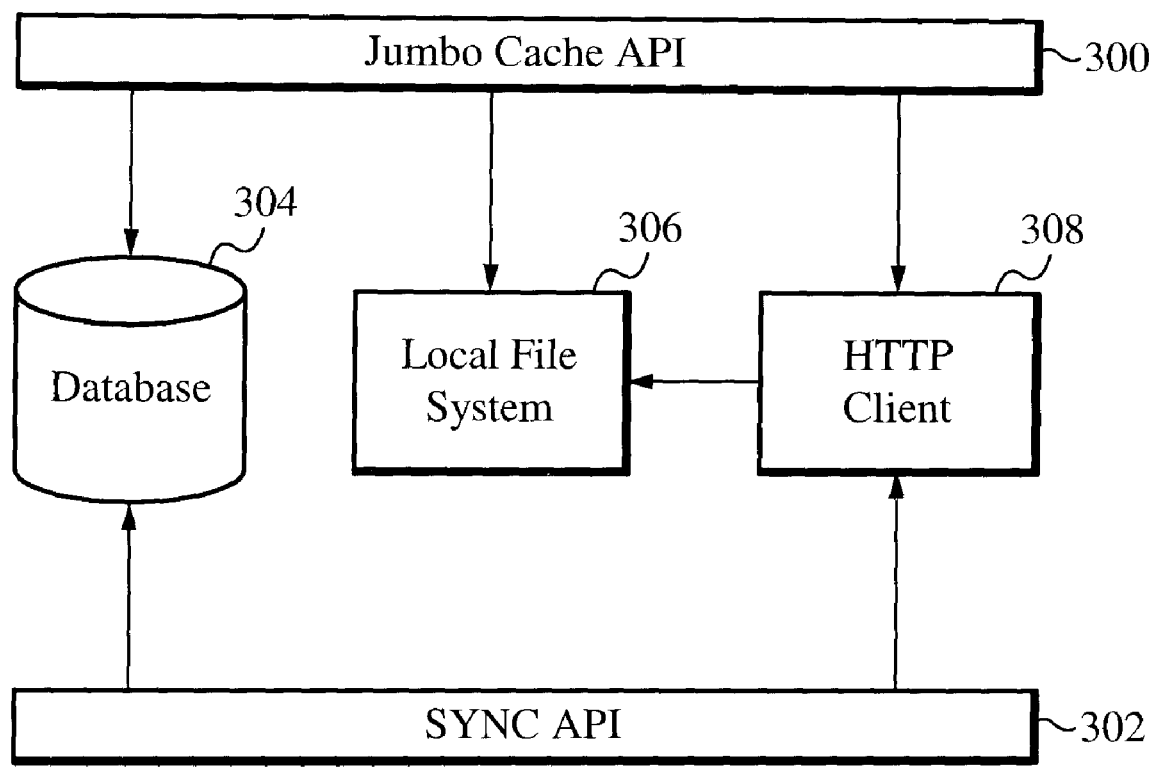
FIG. 5 illustrates a diagram of the architecture of the jumbo cache engine.

A diagram of the architecture of the jumbo cache engine is illustrated in FIG. 5. A jumbo cache application programming interface (API) 300 communicates with a database 304, a local file system 306 and a HTTP client 308. A sync API 302 also communicates with the database 304 and the HTTP client 308. The HTTP client 308 also communicates with the local file system 306.

The jumbo cache API 300 is called directly by applications to store media content data and information. Metadata information regarding the media content is stored in the database 304. The corresponding media content is stored in the local file system 306. The jumbo cache API 300 either obtains the media content from the application directly and stores the data in the local file system 306 or the jumbo cache API 300 provides a uniform resource location (URL) address to the HTTP client 308 which then downloads the media content and stores it in the local file system 306. If the application is to cache information without user intervention, then the application automatically calls the sync API 302, which controls the storing of data and information within the cache engine based on the user defined preferences.

Figure 6A:
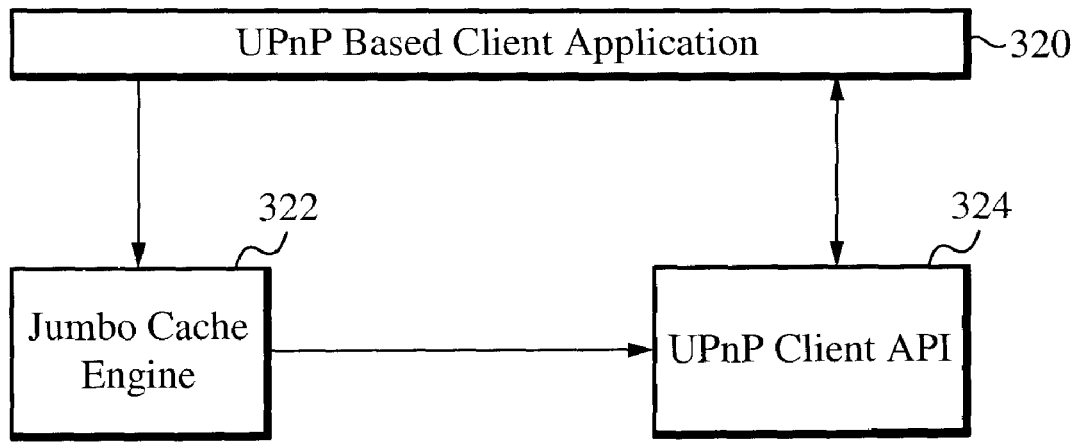
FIGS. 6A and 6B illustrate block flow diagrams showing use scenarios of the jumbo cache engine.
Figure 6B:
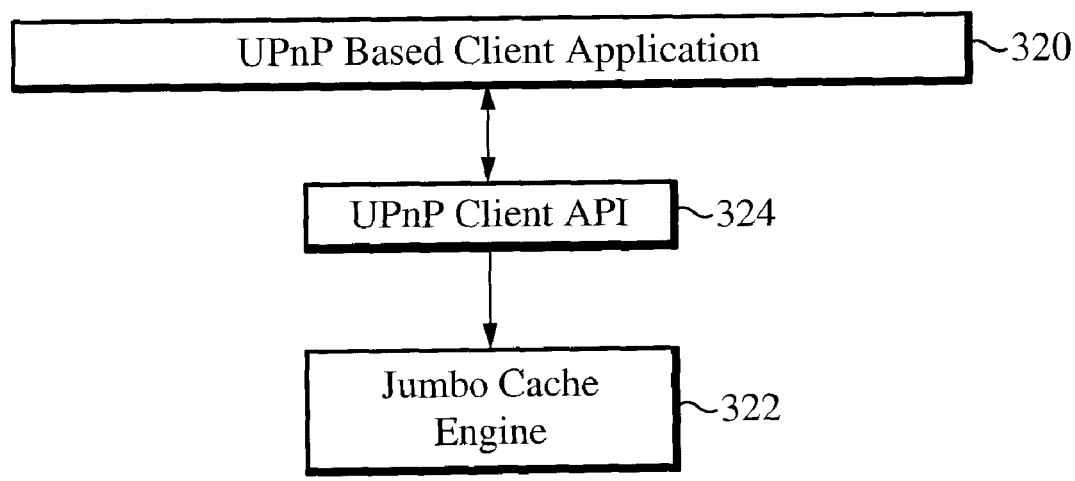

Block flow diagrams showing use scenarios of the jumbo cache engine are illustrated in FIGS. 6A and 6B. In the first use scenario, illustrated in FIG. 6A, the jumbo cache engine 322 is used by the client application 320 directly. In this scenario, the UPnP client API 324 is independent, and is called by both the client application 320 and the jumbo cache engine 322 independently. In the second use scenario, illustrated in FIG. 6B, the jumbo cache engine 322 is integrated with the UPnP client API 324. In this scenario, the client application 320 calls the UPnP client API 324, which in turn then invokes the jumbo cache engine 322. In this second scenario, the client application 320 does not have to communicate directly with the jumbo cache engine 322.

Figure 7:
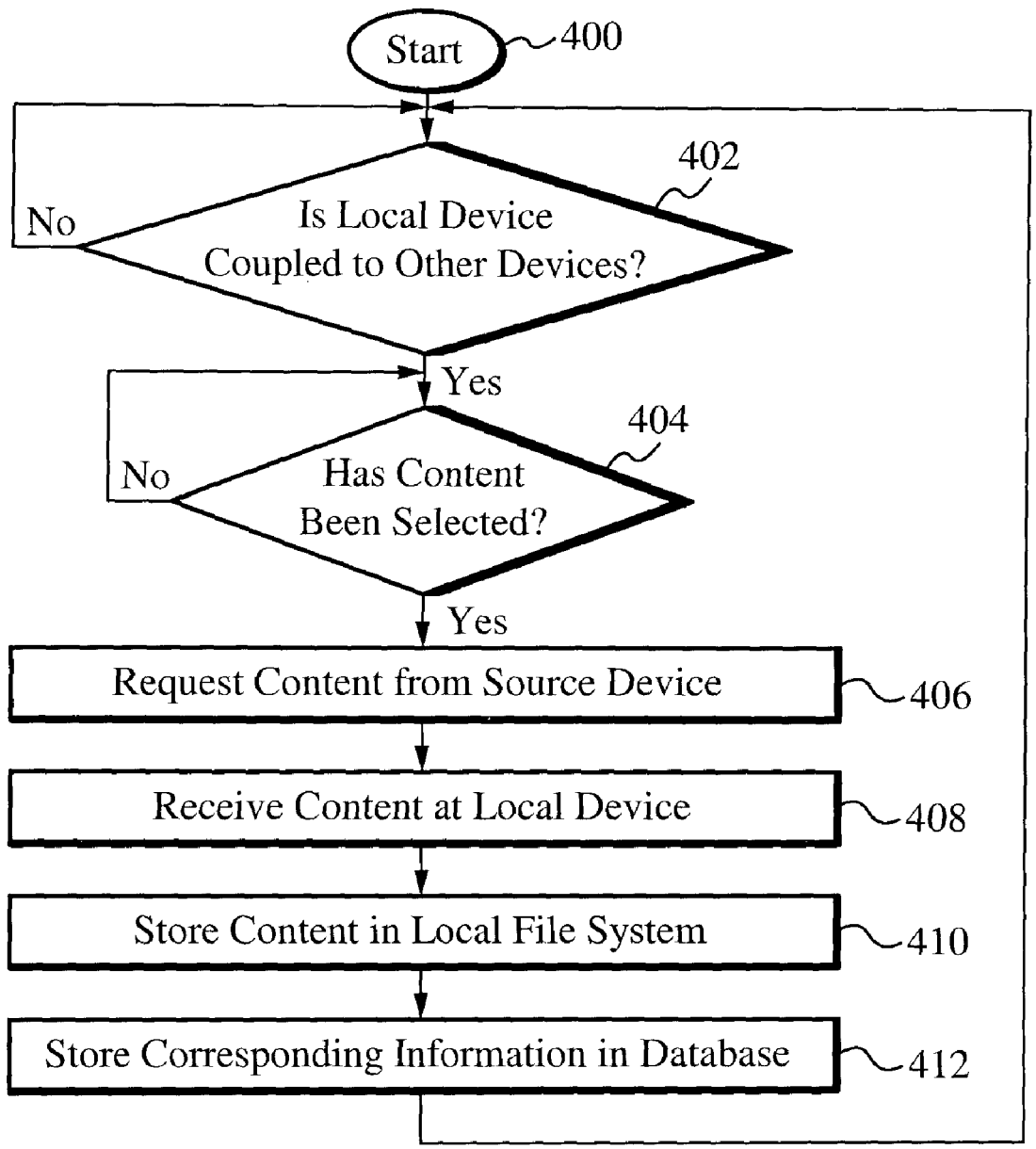
FIG. 7 illustrates a flowchart of a method of selecting, downloading and storing available content.

In one embodiment, a user browses content available from source devices on the network, when the user's local device is coupled to the network, and provides instructions for the local media cache engine within the local device to download the content and store it within the local media cache. In this embodiment, any available content that the user selects is downloaded and stored in the local media cache engine for use by the user at the local device. A flowchart illustrating this method of selecting, downloading and storing the available media content is illustrated in FIG. 7. The method of FIG. 7 starts at the step 400. The system waits at the step 402 until the local device is coupled to one or more other source devices over a network or other connection.

Once it is determined that the local device is coupled to one or more other source devices, then the system waits at the step 404 until the user selects content from a remote source device. Once the user selects content from a remote source device, then the jumbo cache API 300 (FIG. 5) generates and sends a request to the remote device at which the content is stored, at the step 406. This selected content is then sent by the remote source device to the local device, where it is received at the step 408. At the step 410, the received content is stored in the local file system 306 (FIG. 5). At the step 412, the metadata information corresponding to the received content is stored within the database 304 (FIG. 5). The system then returns to the step 402, to determine again that the local device is coupled to one or more other source devices over a network and if so, to wait at the step 404 until additional content is selected.

Figure 8:
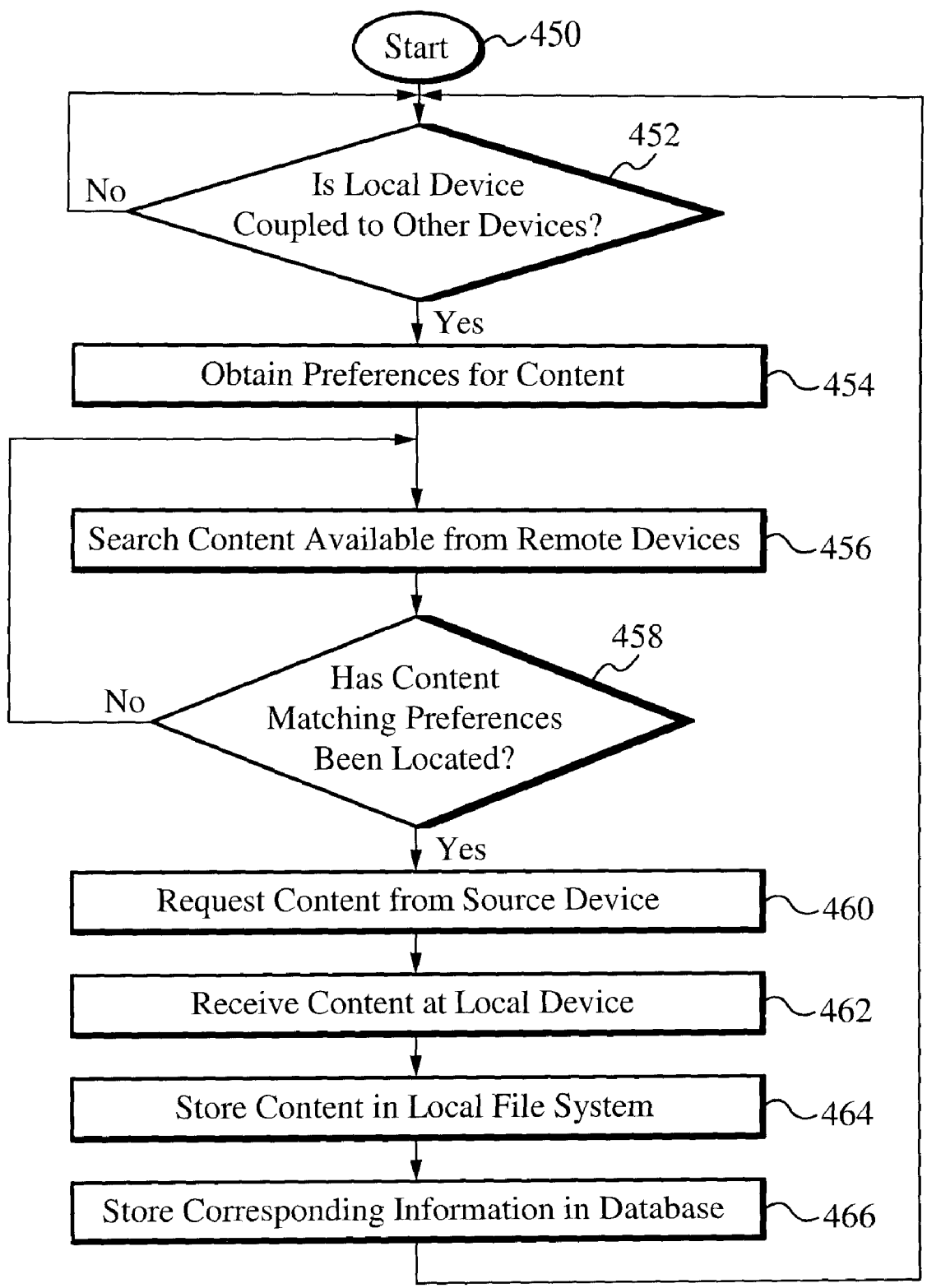
FIG. 8 illustrates a flowchart of a method of identifying, downloading and storing the available content.

In another embodiment, a user has the ability to set up preferences and lists for desired content. In this embodiment, when the local device is coupled to other devices within the network, the local media cache engine automatically and periodically browses the content available on the network, and downloads and stores any content matching the user-defined preferences. A flowchart illustrating this method of identifying, downloading and storing the available content is illustrated in FIG. 8. The method of FIG. 8 starts at the step 450. The system waits at the step 452 until the local device is coupled to one or more other remote source devices over a network or other connection.

Once it is determined that the local device is coupled to one or more other source devices, then the system obtains the user-defined preferences for the content to be downloaded and stored at the local media cache. The content available at the remote source devices is then searched at the step 456. At the step 458, it is determined if any content matching the user-defined preferences is located. Once content matching the user-defined preferences is found at a remote source device, then the jumbo cache API 300 (FIG. 5) generates and sends a request to the remote source device at which the content is stored, at the step 460. This selected content is then sent by the remote source device to the local device, where it is received at the step 462. At the step 464, the received content is stored in the local file system 306 (FIG. 5). At the step 466, the information corresponding to the received content is stored within the database 304 (FIG. 5). The system then returns to the step 452, to determine again that the local device is coupled to one or more other source devices over a network and if so, to continue searching the content available within the devices coupled to the network.

In operation, a user first defines parameters, criteria or lists of desired content. The local media cache engine then automatically searches the source devices to which the local device is coupled through a network of devices and identifies content that matches the user defined parameters. Once content is identified, the local device, on which the jumbo media cache engine is resident, then requests that content from the appropriate source device. The appropriate source device sends the requested content to the local device where it is stored within the local media cache. Once the content is stored within the local media cache, the content is then available for use by the user for playback and/or transfer to a portable device. Alternatively, the user can also manually identify or select content by browsing or searching the content available from the source devices to which the local device is coupled. In the same manner as described above, once selected content is requested, it is then transferred to the local device and stored within the local media cache for playback and/or transfer to a portable device.

A local jumbo media cache engine stores content locally for a particular local device. When the local device is coupled to a network of devices, the content is downloaded or copied from other source devices within the network of devices to the local media cache engine. The content is then available to the local device even when that device is not coupled to the network or when source devices for the content are not coupled to the network. Further, even when the source device of the content is coupled to the network, the local cache provides an easier and faster source of desired content for the local device. The content from the local cache is then available to be transferred to a portable device through a synchronization operation.

To obtain the content to be loaded in the local media cache, the jumbo cache engine identifies content to be downloaded from source devices on a network. This identified content is either content a user selects when searching or browsing the directories of the devices within the network, or content that matches certain user-defined preferences. The local media cache engine also has the capability to automatically search for content from the source devices within the network and download the content to the local cache, based on the user-defined preferences and criteria. Once content is identified, the local media cache engine sends a request to the source device to have the content sent to the local device. The content is then received at the local device and stored within the local media cache for use at the local device. Once the content is stored in the local media cache, the user then has the ability to play, view and/or listen to the content within the local media cache or load the content on a portable device through a synchronization operation or any other appropriate data transfer operation.

The local jumbo media cache engine includes an API, a local file system and a database which includes metadata information about the content item and the source device of each content item. This information is useful for offline playback, when either the local device or the source device is not coupled to the network of devices. This information is also useful for playback in a faster and more efficient manner from the local cache, rather than across the network of devices. The local jumbo media cache engine also allows an application to present a content centric view to a user rather than presenting a device view to the user. Using the local jumbo media cache engine with the saved metadata for each content item, it is easier to search and sort content, based on the corresponding metadata. Also, by storing the content locally within the local jumbo media cache engine, it is useful and fast for an application to load content from multiple source devices on a portable device through a synchronization operation.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention. Specifically, it will be apparent to one of ordinary skill in the art that while the preferred embodiment of the present invention is implemented on a UPnP network, the jumbo media cache engine can alternatively be implemented on networks utilizing other protocols, including networks utilizing multiple protocols.

I claim:

1. A method of locally storing content available from one or more remote source devices within a network of devices comprising:
   identifying and selecting content from a remote source device automatically based on a preference;
   requesting a transfer of the content from the remote source device to the local device;
   storing the content received from the remote source device within a local media cache thereby forming a local content copy on the local device; and
   providing the local content copy for playback and transfer to a portable device.

2. The method as claimed in claim 1 wherein identifying and selecting content is performed periodically based on the preference.

3. The method as claimed in claim 1 further comprising storing metadata information regarding the content received from the remote source device in a database corresponding to the content.

4. The method as claimed in claim 3 wherein the metadata information is obtained from the source device of the content.

5. The method as claimed in claim 1 wherein the network of devices includes devices that are UPnP enabled.

6. The method of claim 1 wherein the content is an advertisement.

7. The method of claim 1 wherein a non-user is involved in identifying and selecting content from a remote source device.

8. An apparatus to store, on a local device, content available from one or more remote source devices within a network of devices comprising:
   an interface to the network of devices;
   a local media cache engine coupled to the interface to request a transfer of identified and selected content from a remote source device; and
   a local media cache coupled to the local media cache engine to store the identified and selected content received from the remote source device thereby forming a local content copy, wherein the local media cache engine receives a preference of content to be selected and automatically identifies and selects content based on the preference.

9. The apparatus as claimed in claim 8 wherein the local media cache engine periodically identifies and selects content based on preference.

10. The apparatus as claimed in claim 8 further comprising a database for storing metadata information regarding the content received from the remote source device corresponding to the local content copy.

11. The apparatus as claimed in claim 10 wherein the metadata information is obtained from the source device of the content.

12. The apparatus as claimed in claim 8 wherein the network of devices includes devices that are UPnP enabled.

13. A local device for storing content available from one or more remote source devices within a network of devices comprising:
   an interface to the network of devices;
   a local media cache engine coupled to the interface to request a transfer of identified and selected content from a remote source device;
   a local media cache coupled to the local media cache engine to store the identified and selected content received from the remote source device thereby forming a local content copy, wherein the local media cache engine receives a preference of content to be selected and automatically identifies and selects content based on the preference; and
   a database coupled to the local media cache engine and the local media cache to store information about the local content copy.

14. The local device as claimed in claim 13 wherein the local media cache engine periodically identifies and selects content based on the preference.

15. The local device as claimed in claim 13 wherein the metadata information is obtained from the source device of the content.

16. The local device as claimed in claim 13 wherein the network of devices includes devices that are UPnP enabled.

17. A local media cache engine to store content available from one or more remote source devices within a network of devices comprising:
- a local media cache to store identified and selected content received from a remote source device thereby forming a local content copy, wherein the local media cache engine receives a preference of content to be selected and automatically identifies and selects content based on the preference; and
- a database coupled to the local media cache to store metadata information about the local content copy.

18. The local media cache engine as claimed in claim 17 wherein the local media cache engine periodically identifies and selects content based on the user defined preferences and criteria.

19. The local media cache engine as claimed in claim 17 wherein the metadata information is obtained from the source device of the content.

20. The local media cache engine as claimed in claim 17 wherein the network of devices includes devices that are UPnP enabled.

21. A network of devices comprising:
- one or more remote source devices each having available content; and
- a local device coupled to the one or more remote source devices to store content available from the one or more remote source devices, the local device including:
  - an interface coupled to the one or more remote source devices;
  - a local media cache engine coupled to the interface to request a transfer of identified and selected content from a remote source device, wherein the local media cache engine receives a preference of content to be selected and automatically identifies and selects content based on the preference; and
  - a local media cache coupled to the local media cache engine to store the identified and selected content received from the remote source device thereby forming a local content copy.

22. The network of devices as claimed in claim 21 wherein the local media cache engine periodically identifies and selects content based on the preference.

23. The network of devices as claimed in claim 21 wherein the local device further comprises a database for storing metadata information regarding the content received from the remote source device corresponding to the local copy.

24. The network of devices as claimed in claim 21 wherein the metadata information is obtained from the source device of the content.

25. The network of devices as claimed in claim 21 wherein the network of devices includes devices that are UPnP enabled.

26. A method of locally storing content available from one or more remote source devices within a network of devices comprising:
- automatically searching the source device;
- identifying and selecting content from the remote source device automatically based on a preference;
- requesting a transfer of the content from the remote source device to the local device;
- storing the content received from the remote source device within a local media cache thereby forming a local content copy on the local device; and
- providing the local content copy for playback and transfer to a portable device.

* * * * *